United States Patent
Park et al.

(10) Patent No.: US 8,983,741 B2
(45) Date of Patent: Mar. 17, 2015

(54) METHOD FOR CONTROLLING A HYDRAULIC PUMP OF A WHEEL LOADER

(75) Inventors: Moo Young Park, Incheon (KR); Yeon Haeng Heo, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/979,068

(22) PCT Filed: Jan. 12, 2012

(86) PCT No.: PCT/KR2012/000293
§ 371 (c)(1),
(2), (4) Date: Aug. 20, 2013

(87) PCT Pub. No.: WO2012/096526
PCT Pub. Date: Jul. 19, 2012

(65) Prior Publication Data
US 2013/0318952 A1 Dec. 5, 2013

(30) Foreign Application Priority Data
Jan. 12, 2011 (KR) .................. 10-2011-0003193

(51) Int. Cl.
*F15B 15/20* (2006.01)
*E02F 9/22* (2006.01)
(Continued)

(52) U.S. Cl.
CPC ............... *F15B 15/20* (2013.01); *E02F 9/2235* (2013.01); *E02F 9/226* (2013.01); *E02F 9/2292* (2013.01); *E02F 9/2296* (2013.01); *E02F 9/2079* (2013.01); *E02F 9/225* (2013.01); *F01P 7/044* (2013.01); *F15B 11/17* (2013.01);
(Continued)

(58) Field of Classification Search
USPC ........ 701/50, 70; 60/327, 329, 396, 420, 421, 60/428, 448, 449, 459
See application file for complete search history.

(56) References Cited

U.S. PATENT DOCUMENTS 5,307,631 A * 5/1994 Tatsumi et al. .................. 60/452
6,314,727 B1 * 11/2001 Prabhu et al. ................... 60/431
(Continued)

FOREIGN PATENT DOCUMENTS

CN 101346549 A 1/2009
JP 11181842 7/1999
(Continued)

OTHER PUBLICATIONS

Search Report dated Sep. 21, 2012 and written in Korean with English translation attached for International Application No. PCT/KR2012/000293 filed Jan. 12, 2011, 5 pages.
(Continued)

*Primary Examiner* — Thomas G Black
*Assistant Examiner* — Ce Li
(74) *Attorney, Agent, or Firm* — John D. Veldhuis-Kroeze; Westman, Champlin & Koehler, P.A.

(57) ABSTRACT

The present disclosure relates to a method for controlling a hydraulic pump of a wheel loader, and more particularly, to a method for controlling a hydraulic pump in order to improve acceleration performance of the wheel loader in a situation in which an injection amount of fuel is limited during an acceleration process of the wheel loader in accordance with stricter regulations on exhaust gas.

12 Claims, 6 Drawing Sheets

(51) Int. Cl.
  *E02F 9/20* (2006.01)
  *F01P 7/04* (2006.01)
  *F15B 11/17* (2006.01)
  *B60W 10/30* (2006.01)
  *B60W 30/188* (2012.01)
  *F02D 29/04* (2006.01)

(52) U.S. Cl.
  CPC .......... *B60W 10/30* (2013.01); *B60W 30/1886* (2013.01); *F15B 2211/20523* (2013.01); *F15B 2211/20576* (2013.01); *F15B 2211/633* (2013.01); *F15B 2211/6651* (2013.01); *F15B 2211/6652* (2013.01); *F15B 2211/6654* (2013.01); *F15B 2211/6655* (2013.01); *F15B 2211/7142* (2013.01); *F02D 29/04* (2013.01); *F15B 2211/781* (2013.01)
  USPC .................... 701/50; 701/70; 60/327; 60/428

(56) References Cited

U.S. PATENT DOCUMENTS

| | | | |
|---|---|---|---|
| 6,408,622 B1* | 6/2002 | Tsuruga et al. | 60/422 |
| 7,287,374 B2* | 10/2007 | Vigholm et al. | 60/329 |
| 7,506,507 B2* | 3/2009 | Fransson et al. | 60/452 |
| 7,797,092 B2* | 9/2010 | Schifferer et al. | 701/50 |
| 7,810,323 B2* | 10/2010 | Iwamoto | 60/431 |
| 8,082,082 B2* | 12/2011 | Matsuyama | 701/50 |
| 8,095,285 B2* | 1/2012 | Schifferer et al. | 701/54 |
| 8,326,499 B2* | 12/2012 | Sopko et al. | 701/50 |
| 8,579,595 B2* | 11/2013 | Cho | 417/46 |
| 8,632,314 B2* | 1/2014 | Imaizumi et al. | 417/22 |
| 8,639,404 B2* | 1/2014 | Sugiyama et al. | 701/22 |
| 2007/0012039 A1* | 1/2007 | Takebe | 60/449 |
| 2007/0193262 A1* | 8/2007 | Iwamoto | 60/421 |
| 2009/0025661 A1* | 1/2009 | Itoga et al. | 123/41.12 |
| 2009/0111655 A1* | 4/2009 | Hatanaka | 477/218 |
| 2009/0126361 A1* | 5/2009 | Kakizawa et al. | 60/445 |
| 2009/0163318 A1* | 6/2009 | Matsuyama | 477/68 |
| 2009/0217654 A1* | 9/2009 | Iwamoto | 60/449 |
| 2010/0070146 A1* | 3/2010 | Ishii et al. | 701/50 |
| 2010/0218494 A1* | 9/2010 | Yasuda et al. | 60/459 |
| 2011/0011076 A1* | 1/2011 | Tanaka et al. | 60/396 |
| 2011/0011356 A1* | 1/2011 | Tanaka et al. | 123/41.12 |
| 2011/0077821 A1* | 3/2011 | Yamaguchi et al. | 701/36 |
| 2011/0293439 A1* | 12/2011 | Imaizumi et al. | 417/42 |
| 2012/0124988 A1* | 5/2012 | Nelson et al. | 60/445 |

FOREIGN PATENT DOCUMENTS

| | | |
|---|---|---|
| JP | 2001295681 | 10/2001 |
| WO | 9213144 A1 | 8/1992 |
| WO | 2006006600 | 1/2006 |
| WO | 2007074670 | 7/2007 |

OTHER PUBLICATIONS

Chinese Office Action dated Nov. 15, 2014 for corresponding Chinese Application No. 201280005192.4.

* cited by examiner

METHOD FOR CONTROLLING A HYDRAULIC PUMP OF A WHEEL LOADER

CROSS-REFERENCE TO RELATED APPLICATION

This Application is a Section 371 National Stage Application of International Application No. PCT/KR2012/000293, filed Jan. 12, 2012 and published, not in English, as WO2012/096526 on Jul. 19, 2012.

FIELD OF THE DISCLOSURE

The present disclosure relates to a method for controlling a hydraulic pump of a wheel loader, and more particularly, to a method for controlling a hydraulic pump in order to improve acceleration performance of the wheel loader in a situation in which an injection amount of fuel is limited during an acceleration process of the wheel loader in accordance with stricter regulations on exhaust gas.

BACKGROUND OF THE DISCLOSURE

Presently, an importance in relation to the environment has become a predominant issue, and according to the global trends, regulations on exhaust gas of a construction machine have become stricter. For example, as standards regarding a discharge of exhaust gas of the construction machine such as a wheel loader, Stage IIIb, Stage IV, and the like that are emission standards of the European Union (EU), and Tier 4 standard and the like that are emission environmental standards of North America are adopted at present or will be adopted.

Meanwhile, unlike the existing regulations on exhaust gas that restricts only the exhaust gas in a steady state, the regulations on exhaust gas, which will be enforced later, also restricts the exhaust gas in a transient state.

For example, because there are no regulations on exhaust gas in the transition state (for example, acceleration state) under the existing regulations, an arbitrary amount of fuel could be injected without limitation with respect to an injection amount of fuel during an acceleration. That is, acceleration performance of the construction machine may be efficiently raised by raising the injection amount of fuel during the acceleration of the construction machine.

However, according to the regulations that will be enforced later, the above method may not be used any longer. For example, the existing method in which the acceleration performance is freely raised by increasing the injection amount of fuel may not be used any longer, and therefore, in order to improve the acceleration performance, a method is considered which reduces a load of a working system or the like except for a load of a traveling system among loads applied to the engine. The reason why the load of the traveling system is excluded is that as a result of reducing the load of the traveling system, the acceleration performance is reduced.

For example, the torque of the engine may be classified into torque of a traveling system, torque of a working system (or torque for front work), torque of a fan, torque of an accessory, and the like, and therefore, it is necessary to reduce the other torque except for the torque of the traveling system among the above torque.

For example, the method of the related art, which reduces the torque of the working system, may be a power shift control that is used in the construction machine such as the existing excavator. FIGS. 1 and 2 are flow charts exemplarily illustrating a method of controlling a power shift in the related art, respectively.

The method of controlling the power shift in the related art as illustrated in FIG. 1 is characterized in that first, the number of revolutions of the engine is detected in real time (S10), it is determined whether a variation amount of the number of revolutions of the engine exceeds a specific value (for example, a) (S12), and then when the variation amount thereof exceeds the specific value (YES), the flow rate of the pump of the working system is controlled (reduced) (S14), and when the variation amount thereof does not exceed the specific value (NO), the flow rate of the pump of the working system is controlled so as to be the maximum flow rate (S16). Here, the operation of controlling the pump flow rate so as to be the maximum flow rate means an operation of controlling the pump of the working system so that all working oil may be discharged at a flow rate that is required for the pump of the working system under control by an operator or equipment.

That is, the method is a method of, when the number of revolutions of the engine is reduced due to external force, adjusting the torque of the working machine by, for example, adjusting an angle of a swash plate of the pump of the working system in accordance with the variation amount of the number of revolutions. The method is a method capable of efficiently controlling the pump of the working system against the torque generated due to external force, but is not appropriate as a method of adjusting torque when the construction machine such as the wheel loader accelerates. For example, the reason is that because the variation amount of the number of revolutions of the engine is not reduced when the wheel loader accelerates, excessive torque under the acceleration condition may not be efficiently detected.

Further, the method of controlling the power shift in the related art as illustrated in FIG. 2 is characterized in that first, the number of revolutions of the engine is detected in real time (S20), it is determined whether the number of revolutions of the engine is below a specific value (for example, b) (S22), and then when the number of revolutions thereof is below the specific value (YES), a flow rate of a fan pump is controlled (reduced) (S24), and when the number of revolutions thereof is not below the specific value (NO), the flow rate of the fan pump is controlled so as to be the maximum flow rate (S26).

The method is a method of controlling the fan pump at a specific number of revolutions or less for acceleration performance in a zone where the number of revolutions is small and an amount of air is insufficient, but there is a limitation in that the condition of the zone where the number of revolutions of the engine is small needs to be basically satisfied, and further, because the method controls only the flow rate of the fan pump, the effect is not high. Therefore, the method is not appropriate as a method of adjusting torque when the construction machine such as the wheel loader accelerates.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An object of the present disclosure is to provide a method for controlling a hydraulic pump of a wheel loader, capable of improving acceleration performance in a transition state (acceleration state).

Another object of the present disclosure is to provide a method for controlling a hydraulic pump of a wheel loader, capable of improving acceleration performance without increasing an injection amount of fuel.

To achieve the above object, an embodiment of the present disclosure provides a method for controlling a hydraulic pump of a wheel loader including: a hydraulic pump including a pump of a working system for driving a working machine, and a fan pump for driving a cooling fan; an engine which drives the hydraulic pump; a transmission which is connected to the engine and drives a traveling means; and a main control unit which is connected to the engine, the transmission, and the hydraulic pump, and controls the engine, the transmission, and the hydraulic pump, the method including: when the engine reaches a rating torque limit during a travel-combined acceleration of the wheel loader, reducing a discharge flow rate of the hydraulic pump by the main control unit to improve acceleration performance of the wheel loader.

In an embodiment of the present disclosure, the main control unit is configured to perform a series of procedures including steps of: a) determining whether there is a request for improving the acceleration performance of the wheel loader; b) determining whether the engine reaches the rating torque limit when there is a request for improving the acceleration performance; c) reducing the discharge flow rate of the hydraulic pump when the engine reaches the rating torque limit; and d) controlling the hydraulic pump to discharge a maximum flow rate when there is no request for improving the acceleration performance or when the engine does not reach the rating torque limit.

Here, it is preferable that step c) reduces a discharge flow rate of the fan pump. In more detail, it is preferable that step c) further includes: determining whether an object to be cooled by the cooling fan is overheated; reducing the discharge flow rate of the fan pump when the object is not in the overheated state; and reducing the discharge flow rate of the pump of the working system when the object to be cooled is in the overheated state. In this state, it is more preferable that step c) further includes determining whether the object to be cooled is overheated in a state in which the discharge flow rate of the pump of the working system is reduced; reducing the discharge flow rate of the fan pump when the object to be cooled is not overheated; and raising the discharge flow rate of the pump of the working system to a range in which there is no request for improving the acceleration performance after checking the request for improving the acceleration performance of the wheel loader in a state in which the discharge flow rate of the fan pump is reduced.

As described above, it is preferable that it is checked whether there is a further request for improving the acceleration performance of the wheel loader after reducing the discharge flow rate of the fan pump, and the discharge flow rate of the pump of the working system is reduced when there is a further request for improving the acceleration performance of the wheel loader.

Meanwhile, it is preferable that the request for improving the acceleration performance in step a) occurs when a transmission velocity ratio of the engine of the wheel loader is a predetermined value or less.

Moreover, it is more preferable that the pump of the working system includes a first main pump which exclusively serves to drive the working machine, and the reducing of the flow rate of the pump of the working system is performed by reducing the flow rate of the first main pump, and then reducing the flow rate of the second main pump after checking whether there is a further request for improving the acceleration performance.

In addition, to achieve another object of the present disclosure, an embodiment of the present disclosure additionally provides a method for controlling a hydraulic pump of a wheel loader including: a hydraulic pump including a pump of a working system for driving a working machine, and a fan pump for driving a cooling fan; an engine which drives the hydraulic pump; a transmission which is connected to the engine and drives a traveling means; and a main control unit which is connected to the engine, the transmission, and the hydraulic pump, and controls the engine, the transmission, and the hydraulic pump, the method including: determining whether there is a request for improving acceleration performance of the wheel loader during a travel-combined acceleration of the wheel loader; reducing a flow rate of the fan pump when there is a request for improving the acceleration performance; and reducing a flow rate of the pump of the working system when there is a further request for improving the acceleration performance of the wheel loader in a state in which the flow rate of the fan pump is reduced.

Here, it is preferable that the reducing of the flow rate of the fan pump includes: determining whether an object to be cooled by the cooling fan is overheated; reducing a discharge flow rate of the fan pump when the object is not in the overheated state; and reducing a discharge flow rate of the pump of the working system when the object to be cooled is in the overheated state.

Moreover, it is more preferable that the pump of the working system includes a first main pump which exclusively serves to drive the working machine, and the reducing of the flow rate of the pump of the working system is performed by reducing the flow rate of the first main pump, and then reducing the flow rate of the second main pump after checking whether there is a further request for improving the acceleration performance.

According to an embodiment of the present disclosure, it is possible to provide a method for controlling a hydraulic pump of a wheel loader, capable of improving acceleration performance by being prepared for regulations on exhaust gas in a transition state (acceleration state), which will be enforced later.

In addition, according to an embodiment of the present disclosure, it is possible to provide a method for controlling a hydraulic pump of a wheel loader, capable of improving acceleration performance without increasing an injection amount of fuel.

In addition, according to an embodiment of the present disclosure, it is possible to provide a method for controlling a hydraulic pump of a wheel loader, which is characterized in that when controlling the hydraulic pump of the wheel loader, a discharge flow rate of the hydraulic pump is sequentially reduced while separating a fan pump and a pump of a working system.

DESCRIPTION OF MAIN REFERENCE NUMERALS OF DRAWINGS

Figure 1:
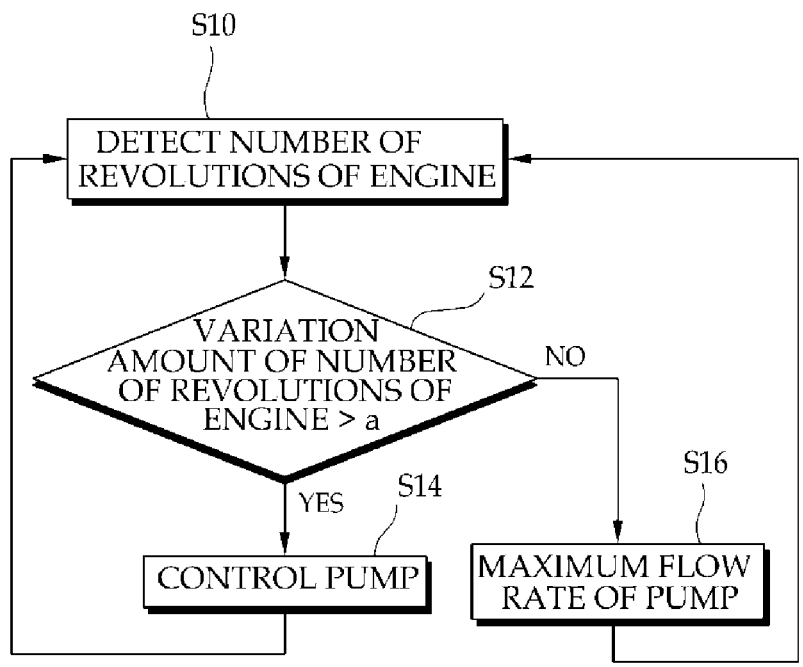
FIG. 1 is a flow chart illustrating an example of a method for controlling a power shift in the related art.
Figure 2:
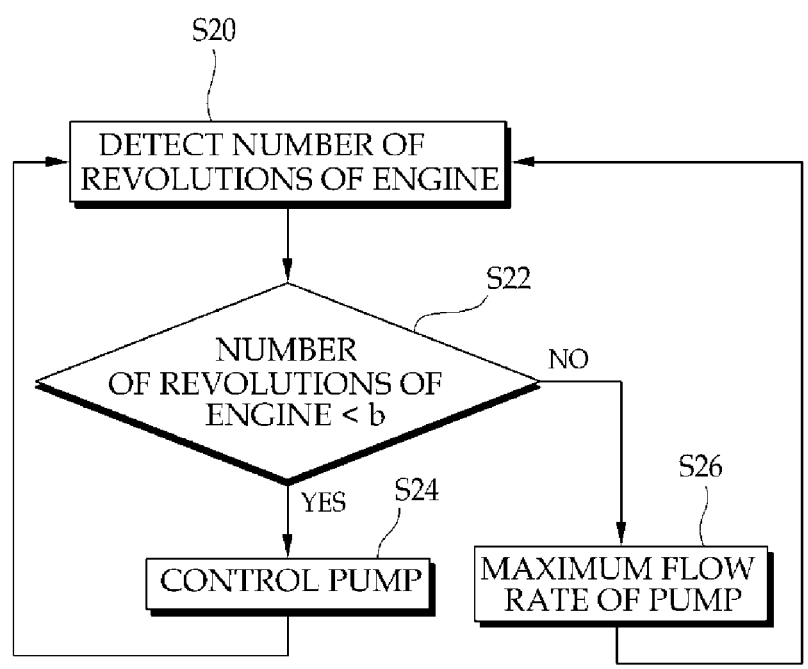
FIG. 2 is a flow chart illustrating another example of a method for controlling a power shift in the related art.

100: Wheel loader
10: Engine (E/G)
12: Engine control unit (ECU)
20: Transmission (T/M)
22: Transmission control unit (TCU)
24: Traveling means
30a, 30b: Main pump (pump of working system)
32a, 32b: Adjuster (adjuster for pump of working system)
34: Steering priority valve
40: Fan pump
42: Adjuster (adjuster for fan pump)
44, 46: Cooling fan
48: Brake means (B/R)
50: Main control unit (vehicle control unit)
60a, 60b, 60c: Main control valve
62a, 62b, 62c: Cylinder of working machine
70: Steering control valve
72: Steering cylinder
74: Steering handle

DETAILED DESCRIPTION

Hereinafter, a preferred exemplary embodiment of the present disclosure will be described with reference to the drawings.

Figure 3:
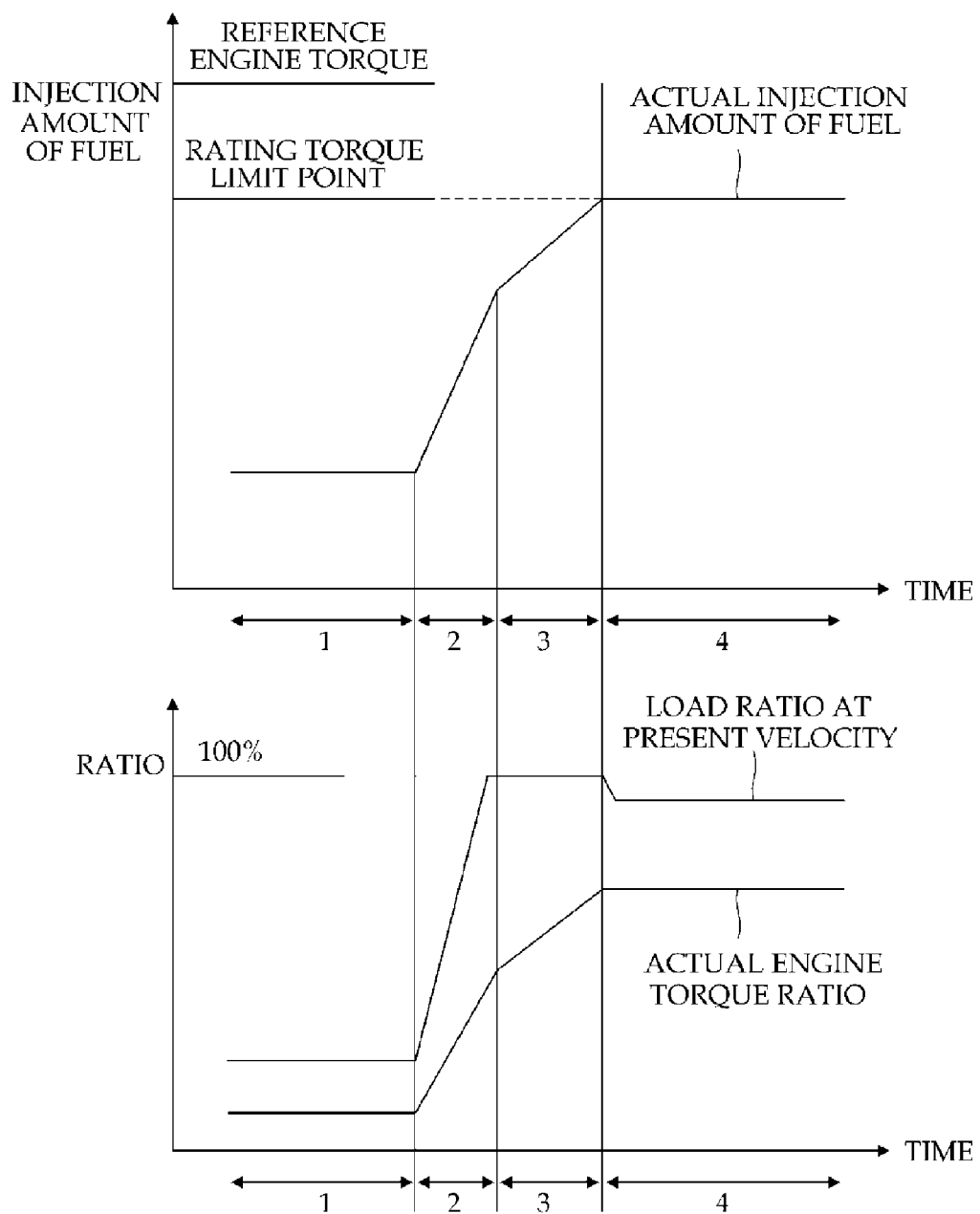
FIG. 3 is a graph illustrating a relationship of engine torque to time, and a graph illustrating a relationship of an engine torque ratio to time.

FIG. 3 is a graph illustrating a relationship of engine torque to time, and a graph illustrating a relationship of an engine torque ratio to time. Referring to FIG. 3, a technical background that is supported in relation to characteristics presented in the present specification will be described.

The core principle of the present disclosure lies in improving acceleration performance of a wheel loader by controlling torque of a working machine at necessary amounts when torque of the working machine is needed while the wheel loader performs travel-combined drive work.

Sections 1, 2, 3, and 4 of FIG. 3 schematically indicate, respectively, a relationship between an injection amount of fuel and torque when a construction machine such as a wheel loader accelerates. For example, the first section refers to when the wheel loader is on standby in a low load state before the wheel loader accelerates, the second section refers to when the wheel loader begins to accelerate and torque of a main working machine is applied such that the injection amount of fuel is being increased, the third section refers to when no more injection at the injection amount of fuel is possible due to limits on fume production (for example, next-generation regulations on exhaust gas, that is, Stage b, Stage IV, Tier-4, and the like, which will be enforced more strictly than the present regulations), that is, a transition state, and the fourth section refers to when an engine reaches a steady state.

As illustrated in FIG. 3, because of the stricter limits on fume production, that is, because the injection amount of fuel in the transition state is limited, the injection amount of fuel may not be arbitrarily increased even in the third section unlike the related art, and thereby a problem is derived which needs to improve the acceleration performance of the wheel loader using methods other than the method of increasing the injection amount of fuel. Accordingly, the present disclosure is characterized in that when the engine reaches a rating torque limit during the travel-combined acceleration like the third section, a load to the working machine (for example, torque of the a working system) is reduced, thereby improving the acceleration performance of the wheel loader.

Here, 'reference engine torque' means maximum torque that may be produced by the engine regardless of the number of revolutions of the engine. In addition, an 'actual engine torque ratio' is defined as (the present injection amount of fuel/the injection amount of fuel at reference engine torque).

Meanwhile, the 'rating torque limit' is affected by factors such as 1) a high temperature, 2) a problem with the engine, 3) a high altitude, and 4) limits on fume production.

In addition, a 'load-velocity ratio at the present velocity' is defined as (the present injection amount of fuel/the injection amount of fuel at the rating torque limit), and the 'rating torque limit' may be indicated as (the actual engine torque ratio×the reference engine torque/the load-velocity ratio at the present velocity).

Hereinafter, characteristics of the present disclosure will be described in detail with reference to a configuration of an exemplary wheel loader and an exemplary control method.

Figure 4:
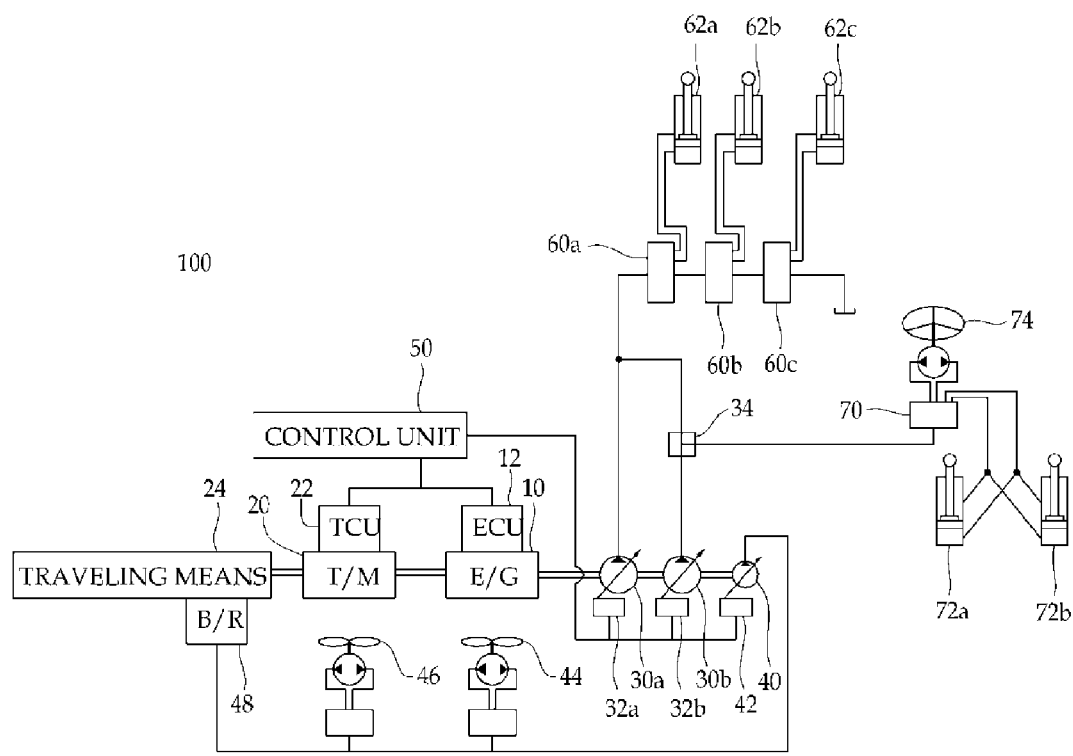
FIG. 4 is a hydraulic circuit diagram schematically illustrating a configuration of a wheel loader according to an exemplary embodiment of the present disclosure.

FIG. 4 is a hydraulic circuit diagram schematically illustrating a hydraulic circuit of the exemplary wheel loader. According to FIG. 4, a wheel loader 100 may include a plurality of hydraulic pumps 30a, 30b, and 40 that is driven by an engine 10, and for example, the hydraulic pumps may include a first main pump 30a which exclusively serves to drive a working machine, a second main pump (or a steering pump) 30b which selectively serves to perform a steering operation through a steering priority valve 34 or assists a drive of the working machine through a confluent circuit, and a fan pump 40 which drives cooling fans 44 and 46, a brake means 48, and the like.

For example, the working machine of the wheel loader such as a boom, and a bucket is driven by, for example, working cylinders 62a, 62b, and 62c to which working oil is supplied through main control valves 60a, 60b, and 60c, and the respective working cylinders may be, for example, first and second boom cylinders, and a bucket cylinder. In addition, a steering means 74 such as a steering handle is supplied with working oil through a steering control valve 70, and further, the working oil is supplied to a pair of steering cylinders 72a and 72b from the steering means 74 such that a steering operation of the wheel loader is performed.

In addition, a transmission 20 is connected to the engine 10 of the wheel loader, and the transmission 20 drives a traveling means 24 such as an axle, thereby allowing the wheel loader to travel.

In addition, an engine control unit (ECU) 12 which serves to control the engine 10, a transmission control unit (TCU) 22 which serves to control the transmission, and adjusters 32a, 32b, and 42 which serve to control an angle of a swash plate of each of the hydraulic pumps 30a, 30b, and 40 are connected to a main control unit 50 of the wheel loader.

For reference, it is noted that in FIG. 4, details for a pilot hydraulic circuit for transmitting pilot pressure to the main control valve and the like are omitted, and only corresponding elements are simply illustrated for better understanding of the present disclosure.

Figure 5:
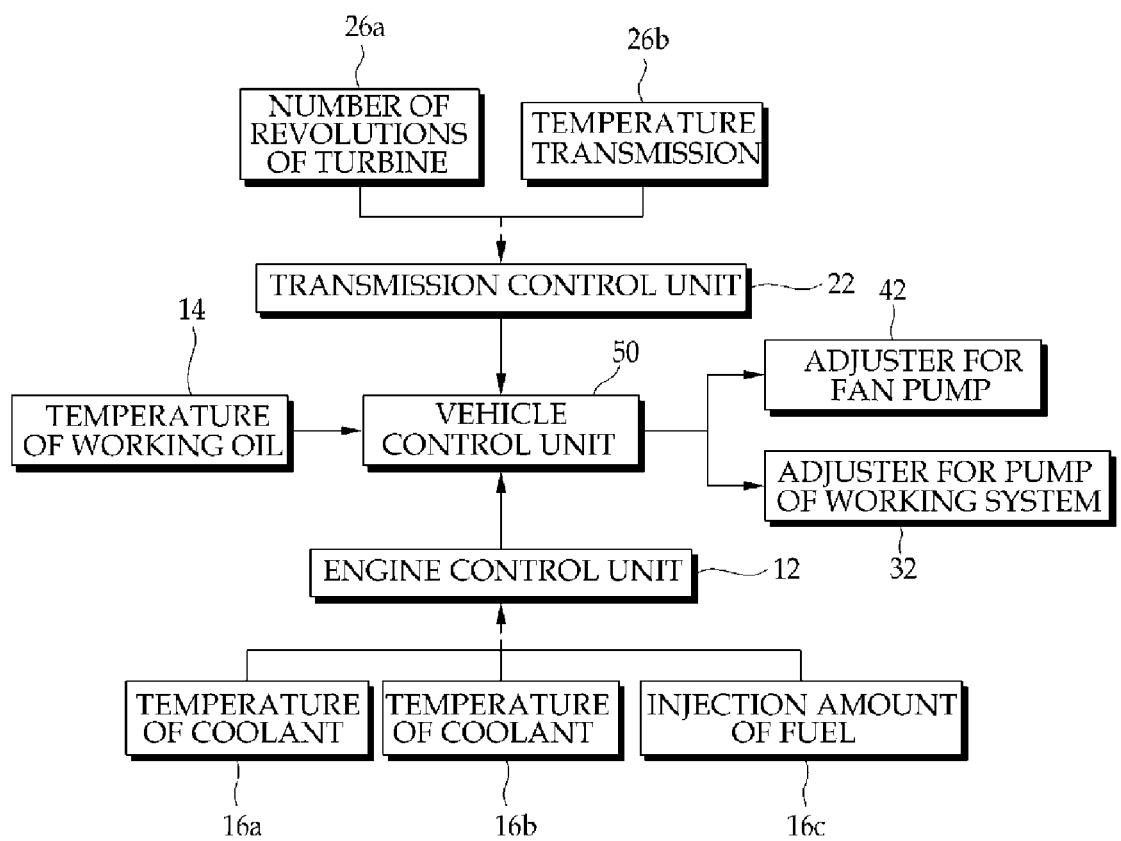
FIG. 5 is a block diagram illustrating input and output of a signal on the basis of a main control unit of FIG. 4.

FIG. 5 is a block diagram exemplarily illustrating, on the basis of the wheel loader of FIG. 4, a plurality of physical quantities detected by the respective elements, and the main control unit 50 which outputs control signals to the corresponding adjusters in order to control a flow rate of each of the hydraulic pumps based on the plurality of physical quantities.

According to FIG. 5, for example, the vehicle control unit 50 that is the main control unit is connected to the transmission control unit (TCU) 22, and the engine control unit (ECU) 12, and the plurality of physical quantities, which is detected by corresponding sensors or the like, is transmitted to the respective control units. For example, the transmission control unit 22 receives values of the number of revolutions 26a of a turbine and a temperature 26b of the transmission from the respective sensors, and outputs the values to the vehicle control unit 50. The engine control unit 12 receives values of a temperature 16a of a coolant, a velocity 16b of the engine, and an injection amount 16c of fuel from the respective sensors, and outputs the values to the vehicle control unit 50. Meanwhile, a physical quantity that may not be transmitted from the engine control unit (ECU) 12 and the transmission control unit 22, for example, a physical quantity such as a temperature 14 of the working oil is directly transmitted to the vehicle control unit 50 from a corresponding sensor.

The vehicle control unit 50 that is the main control unit outputs the control signals to the adjuster 32 for the pump of the working system and the adjuster 42 for the fan pump based on the physical quantities.

Here, for example, the adjuster for the pump of the working system may be the adjuster 32a for the first main pump 30a and the adjuster 32b for the second main pump 30b in FIG. 4. In consideration that the hydraulic pump, which supplies working oil to the working machine, is selectively specified in accordance with whether the steering priority valve 34 is driven, hereinafter, the first main pump 30a and the second main pump 30b are collectively referred to as 'pumps of the working system' in the present specification.

For example, when the second main pump only serves to perform the steering operation as the steering priority valve 34 is driven, the pump of the working system of the present disclosure indicates only the first main pump 30a, but on the other hand, when the working oil discharged from the second main pump is supplied to the main control valves (30a, 30b, and 30c of FIG. 3) for the working machine together with the working oil discharged from the first main pump through the confluent circuit, the pumps of the working system of the present disclosure may indicate both of the first main pump 30a and the second main pump 30b.

Next, a specific method for controlling the hydraulic pump according to the present disclosure will be described with reference to FIGS. 6 and 7.

Figure 6:
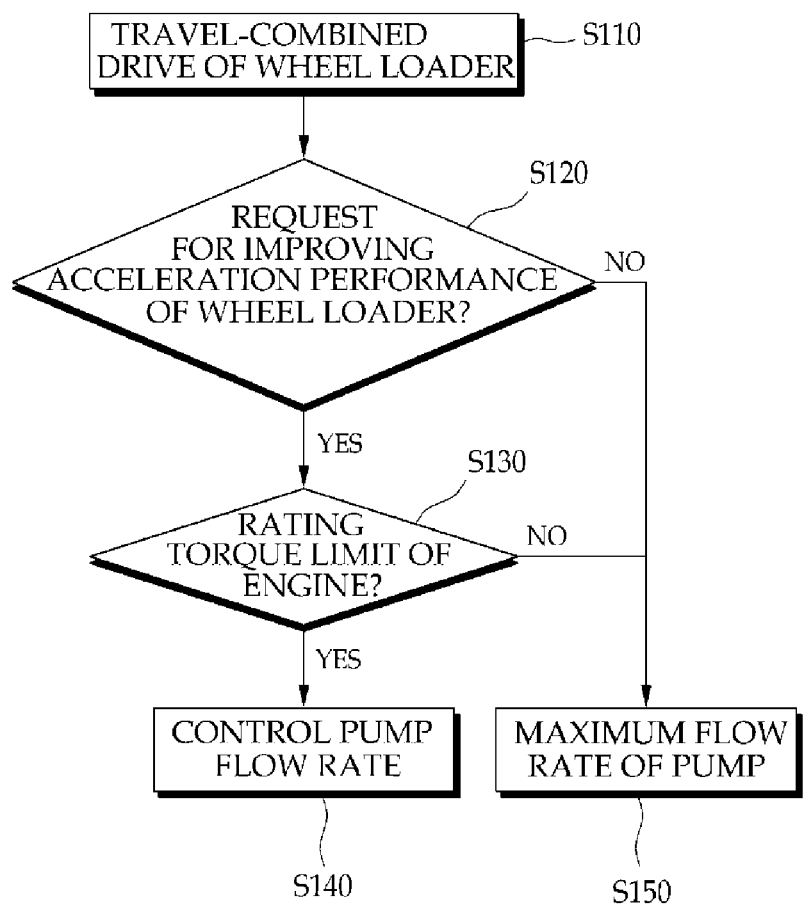
FIG. 6 is a flow chart illustrating a method for controlling a hydraulic pump according to the present disclosure.
Figure 7:
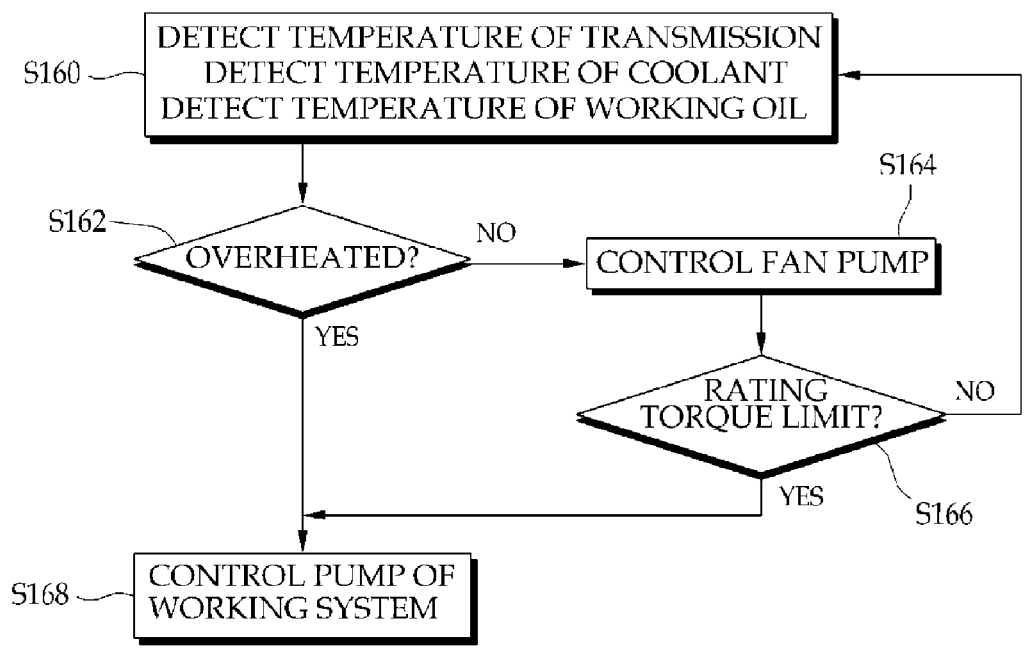
FIG. 7 is a detailed flow chart exemplarily illustrating a step of controlling a pump flow rate of FIG. 6.

FIG. 6 is a flow chart illustrating a method for controlling the hydraulic pump according to the present disclosure, and FIG. 7 is a detailed flow chart exemplarily illustrating a step of controlling a pump flow rate of FIG. 6.

According to FIG. 6, the present disclosure starts from a step in which the wheel loader performs a travel-combined drive (step S110). During the travel-combined drive, in a state in which the injection amount of fuel is limited in the transition state (acceleration state) in accordance with the stricter regulations on exhaust gas, it is determined whether the wheel loader needs to accelerate. That is, it is determined whether there is a request for improving the acceleration performance of the wheel loader (step S120).

Here, the determination with respect to the request for improving the acceleration performance of the wheel loader may be specified as the following two types. For example, when the wheel loader travels after determining whether the wheel loader travels, it may be determined that there is the request for improving the acceleration performance of the wheel loader. In addition, for example, when a transmission velocity ratio is a predetermined value or less as a result of calculating the transmission velocity ratio of the engine, it may also be determined that there is the request for improving the acceleration performance of the wheel loader. That is, whether the wheel loader travels and whether the transmission velocity ratio is a predetermined value or less may be a specific determination reference when performing a flow rate control with respect to the pump of the working system.

Here, the transmission velocity ratio of the engine is defined as (the number of revolutions of the turbine of the transmission/the number of revolutions of the engine), and because load torque is high when the transmission velocity ratio of the engine is low, the transmission velocity ratio of the engine may be utilized as a determination reference when performing a flow rate control with respect to the pump of the working system.

When the wheel loader needs to accelerate, that is, when there is the request for improving the acceleration performance of the wheel loader (YES), it is determined whether the engine of the wheel loader reaches the rating torque limit (step S130). If the engine reaches the rating torque limit (YES), a control for the pump flow rate is performed according to characteristics of the present disclosure (step S140).

For reference, whether the engine reaches the rating torque limit may be determined by obtaining the actual engine torque ratio, and then checking whether the torque at the present engine velocity is the maximum torque. For example, in consideration that the rating torque limit is defined as (the actual engine torque ratio×the reference engine torque/the load-velocity ratio at the present velocity, it may be determined whether at the present time, the engine reaches the rating torque limit by obtaining the above two values (the actual engine torque ratio and the load-velocity ratio at the present velocity).

As such, when the torque of the engine is classified into torque of a traveling system, torque of a working system, torque of a fan, torque of an accessory, by reducing the other torque (for example, torque of the working system, the torque of the fan, and the like) except for the torque of the traveling system, the acceleration performance of the wheel loader may be improved without increasing the injection amount of fuel.

If there is no request for improving the acceleration performance of the wheel loader or the engine does not reach the rating torque limit, the hydraulic pump is controlled at the maximum flow rate (step S150). Here, the operation of controlling the hydraulic pump at the maximum flow rate means an operation of controlling the pump of the working system so that all working oil may be discharged at a flow rate that is required for the pump of the working system under control by an operator or equipment.

As described above, the present disclosure is characterized in that when there is a limitation with respect to the injection amount of fuel (for example, regulations on fume production) in accordance with the stricter regulations on exhaust gas, in the transition state not in the steady state, by performing the flow rate control for the pump of the working system without increasing the injection amount of fuel, that is, reducing the flow rate of the working oil discharged from the pump of the working system, the torque of the working system of the engine is reduced, thereby improving the acceleration performance.

Meanwhile, a step of controlling the pump flow rate of step S140 may be performed step by step, as illustrated in FIG. 7. For example, as illustrated in FIG. 7, first, a temperature of an object to be cooled (transmission, cooling oil, working oil and the like), which is cooled by the cooling fan, is detected (step S160). Based on the detected temperature, it is determined whether the object to be cooled is in an overheated state at present (step S162). When the object is not in the overheated state (NO), the discharge flow rate of the fan pump is controlled (reduced) (step S164). That is, when the object is not in the overheated state, the fan pump is available to make an output, and thus the discharge flow rate (torque of the fan) of the fan pump is reduced by an amount corresponding to the availability. The above control refers to a primary control of the pump flow rate control according to the present disclosure.

Next, after controlling the flow rate using the fan pump, it is determined whether the engine is still in the state of the rating torque limit (step S166). If the engine does not reach the rating torque limit, the procedure returns back to step S160 of detecting the temperature of the object to be cooled, and then the following steps thereof are repeated.

If the object to be cooled is in the overheated state ('YES' in step S162) or the engine is still in the state of the rating torque limit ('YES' in step S166), the procedure proceeds to step S168 of reducing the discharge flow rate of the pump of the working system. That is, when the object is in the overheated state or the engine is continuously in the state of the rating torque limit even after controlling the fan pump, the discharge flow rate (torque of the working system) of the pump of the working system is reduced. The above control refers to a secondary control of the pump flow rate control according to the present disclosure. Accordingly, when the overheated state is detected, only the pump of the working system solely reduces the flow rate. If there is a further request for improving the acceleration performance, the pump of the working system together with the fan pump reduces the flow rate.

Meanwhile, according to the exemplary embodiment of the present disclosure, even though the aforementioned discharge flow rate of the pump of the working system is reduced, it is preferable to continuously check whether the object to be cooled is overheated. The reason is that the flow rate control for the pumps 30a and 30b of the working system affects working efficiency. Hereby, when the overheated state of the object to be cooled is removed even in a state in which the flow rates of the pumps 30a and 30b of the working systems except for the fan pump 40 are reduced, the working efficiency may be improved by raising or adjusting again the discharge flow rate of the pumps 30a and 30b of the working systems by reducing the flow rate of the fan pump 40.

In addition, like the preferred exemplary embodiment of the present disclosure, the pump of the working system may include the first main pump 30a which exclusively serves to drive the working machine, and the second main pump 30b which serves to drive other parts such as a steering apparatus. In this case, it is preferable that the operation of adjusting the flow rate of the pumps 30a and 30b of the working systems is performed by first, adjusting the flow rate of the first main pump 30a, and then additionally adjusting the flow rate of the second main pump 30b when it is further necessary to adjust the flow rate in order to improve the acceleration performance. The reason is that when the flow rate of the second main pump 30b is adjusted first, there may be a problem in driving other hydraulic apparatuses not the working machine. Therefore, in the case of the present exemplary embodiment in which the second main pump 30b serves to drive even the steering apparatus, when the flow rate of the second main pump 30b is reduced during the travel-combined work, there may be a problem in that drive responsiveness of the steering apparatus deteriorates.

As illustrated in FIG. 7, the pump flow rate control according to the present disclosure is characterized by a sequential control performed by firstly controlling the flow rate of the fan pump, and then secondly controlling the flow rate of the pump of the working system. Consequently, the above control allows the pump flow rate to be controlled while minimally influencing the working performance.

As described above, the present disclosure relates to the method for controlling the hydraulic pump in order to improve the acceleration performance of the wheel loader during a travel-combined drive of the wheel loader. Particularly, the present disclosure relates to the method for controlling the hydraulic pump in order to improve the acceleration performance of the wheel loader in a situation in which the injection amount of fuel of the wheel loader in the transition state (acceleration process) is limited in accordance with the stricter regulations on exhaust gas.

To this end, the present is characterized in that when the engine reaches the rating torque limit in the transition state due to the limits on fume production, by reducing the other torque except for the torque of the traveling system among a plurality of elements that configures the torque of the engine, the torque of the traveling system is increased, thereby improving the acceleration performance of the wheel loader. Therefore, the present disclosure may cope with stricter regulations in respect to the exhaust gas (for example, the limits on fume production in the transition state).

According to the present disclosure, it is possible to provide a method for controlling a hydraulic pump of a wheel loader, capable of improving acceleration performance in a transition state (acceleration state).

In addition, according to the present disclosure, it is possible to provide a method for controlling a hydraulic pump of a wheel loader, capable of improving acceleration performance without increasing an injection amount of fuel.

In addition, according to the present disclosure, it is possible to provide a method for controlling a hydraulic pump of a wheel loader, which is characterized in that when controlling the hydraulic pump of the wheel loader, a discharge flow rate of the hydraulic pump is sequentially reduced while separating a fan pump and a pump of a working system.

Although the present disclosure has been described with reference to exemplary and preferred embodiments, workers skilled in the art will recognize that changes may be made in form and detail without departing from the spirit and scope of the disclosure.

The invention claimed is:

1. A method for controlling a hydraulic pump of a wheel loader comprising:
 a hydraulic pump including a pump of a working system for driving a working machine, and a fan pump for driving a cooling fan;
 an engine which drives the hydraulic pump;
 a transmission which is connected to the engine and drives a traveling means; and
 a main control unit which is connected to the engine, the transmission, and the hydraulic pump, and controls the engine, the transmission, and the hydraulic pump,
 the method comprising:
 when the engine reaches a rating torque limit during a travel-combined acceleration of the wheel loader, reducing a discharge flow rate of the hydraulic pump by the main control unit to improve acceleration performance of the wheel loader;
 wherein the main control unit is configured to perform a series of procedures including steps of:

a) determining whether there is a request for improving the acceleration performance of the wheel loader;

b) determining whether the engine reaches the rating torque limit when there is a request for improving the acceleration performance;

c) reducing the discharge flow rate of the hydraulic pump when the engine reaches the rating torque limit; and d) controlling the hydraulic pump to discharge a maximum flow rate when there is no request for improving the acceleration performance or when the engine does not reach the rating torque limit.

2. The method of claim 1, wherein step c) reduces a discharge flow rate of the fan pump.

3. The method of claim 2, wherein step c) further includes:
determining whether an object to be cooled by the cooling fan is overheated;
reducing the discharge flow rate of the fan pump when the object is not in the overheated state; and
reducing the discharge flow rate of the pump of the working system when the object to be cooled is in the overheated state.

4. The method of claim 3, wherein step c) further includes:
checking whether there is a further request for improving the acceleration performance of the wheel loader after reducing the discharge flow rate of the fan pump; and
reducing the discharge flow rate of the pump of the working system when there is a further request for improving the acceleration performance of the wheel loader.

5. The method of claim 3, wherein step c) further includes:
determining whether the object to be cooled is overheated in a state in which the discharge flow rate of the pump of the working system is reduced;
reducing the discharge flow rate of the fan pump when the object to be cooled is not overheated; and
raising the discharge flow rate of the pump of the working system to a range in which there is no request for improving the acceleration performance after checking the request for improving the acceleration performance of the wheel loader in a state in which the discharge flow rate of the fan pump is reduced.

6. The method of claim 5, wherein step c) further includes:
checking whether there is a further request for improving the acceleration performance of the wheel loader after reducing the discharge flow rate of the fan pump; and
reducing the discharge flow rate of the pump of the working system when there is a further request for improving the acceleration performance of the wheel loader.

7. The method of claim 2, wherein step c) further includes:
checking whether there is a further request for improving the acceleration performance of the wheel loader after reducing the discharge flow rate of the fan pump; and
reducing the discharge flow rate of the pump of the working system when there is a further request for improving the acceleration performance of the wheel loader.

8. The method of claim 1, wherein the request for improving the acceleration performance in step a) occurs when a transmission velocity ratio of the engine of the wheel loader is a predetermined value or less.

9. A method for controlling a hydraulic pump of a wheel loader comprising:
a hydraulic pump including a pump of a working system for driving a working machine, and a fan pump for driving a cooling fan;
an engine which drives the hydraulic pump;
a transmission which is connected to the engine and drives a traveling means; and
a main control unit which is connected to the engine, the transmission, and the hydraulic pump, and controls the engine, the transmission, and the hydraulic pump,
the method comprising:
determining whether there is a request for improving acceleration performance of the wheel loader during a travel-combined acceleration of the wheel loader;
reducing a flow rate of the fan pump when there is a request for improving the acceleration performance; and
reducing a flow rate of the pump of the working system when there is a further request for improving the acceleration performance of the wheel loader in a state in which the flow rate of the fan pump is reduced.

10. The method of claim 9, wherein the reducing of the flow rate of the fan pump includes:
determining whether an object to be cooled by the cooling fan is overheated;
reducing a discharge flow rate of the fan pump when the object is not in the overheated state; and
reducing a discharge flow rate of the pump of the working system when the object to be cooled is in the overheated state.

11. The method of claim 10, wherein the pump of the working system includes a first main pump which exclusively serves to drive the working machine, and the reducing of the flow rate of the pump of the working system is performed by reducing the flow rate of the first main pump, and then reducing the flow rate of a second main pump after checking whether there is a further request for improving the acceleration performance.

12. The method of claim 9, wherein the pump of the working system includes a first main pump which exclusively serves to drive the working machine, and the reducing of the flow rate of the pump of the working system is performed by reducing the flow rate of the first main pump, and then reducing the flow rate of a second main pump after checking whether there is a further request for improving the acceleration performance.

* * * * *